Aug. 23, 1966  J. C. KOTELLY ETAL  3,268,244
UNIVERSAL COUPLER

Filed Sept. 4, 1963  2 Sheets-Sheet 1

INVENTORS
JOHN C. KOTELLY &
ANTHONY SCIOLA
BY
Wade Kountz
Sherman H. Goldman
ATTORNEYS Aug. 23, 1966 J. C. KOTELLY ETAL 3,268,244
UNIVERSAL COUPLER
Filed Sept. 4, 1963 2 Sheets-Sheet 2

INVENTORS
JOHN C. KOTELLY &
ANTHONY SCIOLA
BY
Sherman H. Goldman
ATTORNEYS

United States Patent Office 3,268,244
Patented August 23, 1966

1

3,268,244
UNIVERSAL COUPLER
John Christopher Kotelly, 176 Marine Road, South Boston, Mass., and Anthony Sciola, 509 Ferry St., Everett, Mass.
Filed Sept. 4, 1963, Ser. No. 306,667
5 Claims. (Cl. 285—235)

The invention described herein may be manufactured and used by or for the United States Government for governmental purposes without payment to us of any royalty thereon.

This invention relates generally to couplers and more particularly to a coupling or coupling end which is flexible and allows for a temporary reduction in its diameter to effect a joinder with either another flexible tube or with a rigid structure.

The couplings of the prior art generally utilize flanges which are bolted, clamped or otherwise secured together in order to achieve a union of the two pipes, tubes or conduits. Very often a separate coupling element is introduced between two sections of pipe, conduit or tubing that are to be joined.

The coupling of this invention may be utilized between two sections of tubing, or alternatively, the coupling itself can form at least one of the sections of conduit to be joined. In addition, the coupling may be formed as an end portion of a section of rigid pipe. The invention contemplates the utilization of a resilient form which is capable of being twisted or squeezed to reduce the diameter or dimensions of its end and a pliable, resilient plastic material encompassing the form to provide the walls of the tubing or pipe.

Accordingly, it is an object of this invention to produce a novel coupling between two pipes or tubes without the utilization of separate coupling elements for each conduit.

It is another object of this invention to provide a novel coupling which allows for twisting of the end flanges to reduce their dimensions to allow insertion in a conduit having mating grooves or corrugations.

It is still another object of this invention to provide a collapsible coupling which is easily released to allow it to extend to its full dimensions.

It is a further object of this invention to provide a method of forming a flexible flange capable of being twisted for coupling purposes.

A still further object of this invention involves the provision of a device for producing a temporary crimp in a flexible flange of the coupling of this invention.

Another object of this invention involves the utilization of the property of plastic pipe or tubing wherein the pipe is usually easily collapsed by external pressure and is relatively rigid under an internal pressure in order to produce a group of pipe joints.

Still another object of this invention involves the utilization of flexible couplings wherein the flexibility is utilized to produce a sealing action with mating members to which the coupling is attached.

An additional object of this invention involves the provision of a novel collapsible coupling which may be easily manufactured of conventional, currently available materials that lend themselves to mass production manufacturing techniques.

These and other advantages, features and objects of the invention will become more apparent from the following description taken in connection with the illustrative embodiments in the accompanying drawings, wherein:

FIGURE 1 is a pictorial view of the form utilized in the manufacture of the couplings of this invention;

2

Figure 1:
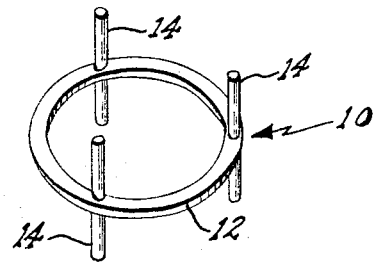

Reference is made to FIGURE 1 which shows a form around which the couplings of this invention are built. Basically, the form 10 comprises a ring 12 which, although shown in the shape of a toroid, may conform to any nonstandard or standard shape desired for a tube conduit or pipe. Extending from the annular ring 12 are a series of upstanding spring members 14, the number of which would depend upon the desired strength, rigidity and the diametral dimensions of the completed coupling. Depending upon the application, the resilient members 14 might be placed on one or both sides of the ring 12.

Figure 2:
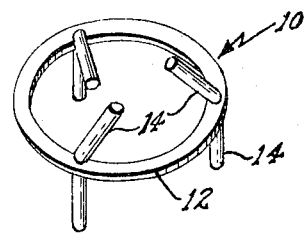
FIGURE 2 is a pictorial representation of the form under the action of a twisting motion.
Figure 3:
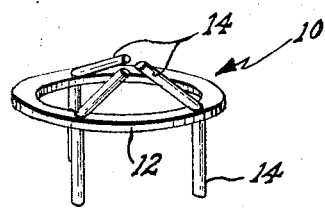
FIGURE 3 is a representation of the same form with the position it assumes under a squeezing action.

As can be seen relative to FIGURE 2, a twisting at the end of the resilient members 14 remote from the annular ring would produce the general shape shown which causes a reduction in diameter at the said end. FIGURE 3 illustrates the shape the form 10 would take when a squeezing action is applied to the ends 14 which are not attached to the toroid 12.

Figure 4:
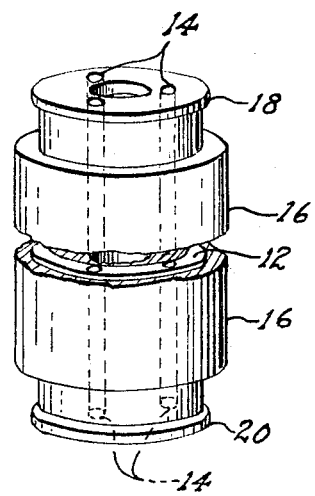
FIGURE 4 is an isometric view of a completed coupling unit utilizing the form shown in FIGURE 1.

The form 10 is covered with a resilient, pliable plastic material 16, as shown in FIGURE 4, which is arranged to form a flange portion 18 on at least one end. The other end of the coupling may also contain a flange 20. The choice of connecting portions 18 and 20 depend upon the application to which the coupling is to be placed. The ends may have any combination of male and female coupling members.

The structure of FIGURE 4 may be manufactured by conventional molding techniques or by spraying and machining operations. When the structure of FIGURE 4 is squeezed so that the form 10 within the structure collapses to the shape illustrated in FIGURE 3, the plastic material 16 would form longitudinal folds which are deepest at the end of the coupling to allow the insertion of the coupling end 18 into a mating unit. Release of the squeezing action would allow the resiliency of the spring members to cause an expansion of the coupling flange 18 to its original diameter which would then be sealed within a mating groove. A twisting action which would cause the form to assume the shape of FIGURE 2 would form generally longitudinal, helical corrugations in the plastic 16 with the same resultant reduction of diameter of the coupling end. In order to facilitate the fluting or corrugating, the plastic 16 might be of reduced thickness or grooved between the spring members 14.

Figure 5:
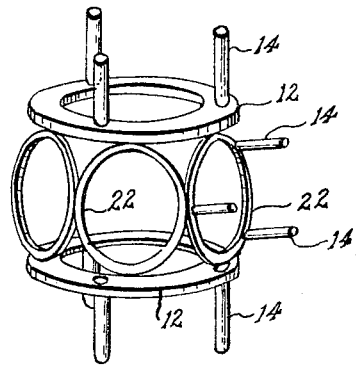
FIGURE 5 is a pictorial representation of an alternative embodiment of the form which may be used to produce T's, crossovers, elbows, etc.

The thus far described embodiments have contemplated only straight through coupling arrangements; however, the embodiment illustrated in FIGURE 5 will allow for a T, elbow or cross-over structures since a pair of coaxial rings 12 are utilized with toroidal separations 22, only a few of which are shown, around their periphery. The separations 22 are orthogonally oriented with respect to rings 12. It should be obvious that with the application of spring members 14 in the desired directions, a coupling having a variety of shapes and flow passageways could be formed. The addition of the plastic material 16 as in FIGURE 4, would complete the unit.

Figure 6:
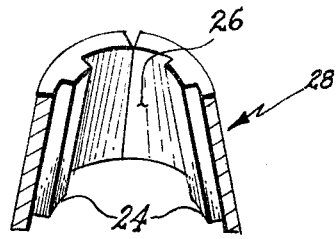
FIGURE 6 is a view in cross-section of a tool capable of producing the proper squeezing action on the couplings of this invention.
Figure 7:
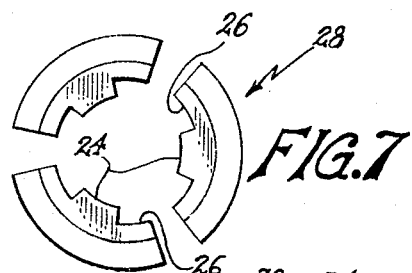
FIGURE 7 is a top view of the tool of FIGURE 6 showing the segments of the tool which have a capability of accommodating various diameters of couplings.

In order to facilitate an insertion of the coupling within the mating pipe or conduit a frusto-conical tool 28 having alternate lands 24 and grooves 26, as illustrated in FIGURE 6, may be applied to the end of the pipe to be joined. The coupling is forced partially through the tool in order to cause a proper folding in the longitudinal direction of the coupling in order to cause the form 10 to assume the shape shown in FIGURE 3. FIGURE 7 is a top view of the tool of FIGURE 6; however, the segments of the cone have been separated in order to illustrate the accommodation of the tool for various sizes of coupling diameters and the method of release of the tool from a coupling. The adjustment of the tool to the different diameters could be by means of a conventional chuck arrangement or by the attachment of the segment to rings which would produce the proper internal dimensions. Of course, the number of lands would correspond to the number of longitudinal corrugations desired. The structure of FIGURE 8 illustrates the frusto-conical tool 28 with helical lands 30 in order to create a twisting action to produce a distortion of the form 10 in the manner shown in FIGURE 2.

Figure 8:
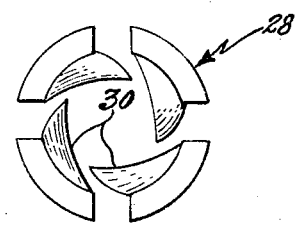
FIGURE 8 is a representation of an alternative embodiment of the tool to produce a twisting action in the coupling.

It is contemplated that with relatively flexible plastic the coupling might be twisted or squeezed manually without the utilization of the tools of FIGURES 6 through 8. Alternatively, if the flanges or ends of the couplings are contorted immediately after manufacture they might be presented for delivery with slip nooses holding them in the crimped posiiton such that release of the noose, for example, by means of a tear wire would release the coupling to allow the spring members 14 to expand the unit to the desired diameter.

Figure 9:
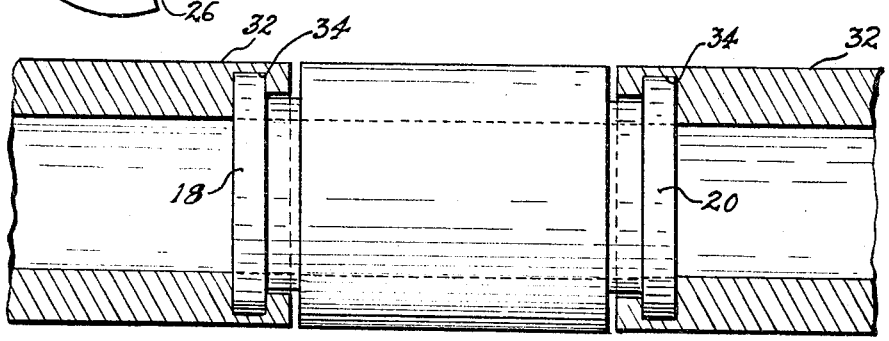
FIGURE 9 is a cross-sectional view of the coupling as applied between two rigid pipes or conduits.

FIGURE 9 shows the application of the coupling between two pipes 32 having grooves 34 in their end portions. The flanges 18 and 20 have been expanded into the grooves 34 by the form rods 14 after insertion of the couplings into said ends. When an internal pressure is applied to the resultant assembly, the flanges 18, because of their resilient nature, will seal against the grooves with an action similar to that obtained with O-rings.

Where a coupling is to form a length of pipe the entire unit could be made of plastic with the form members 10 at the ends thereof, or a length of rigid pipe might be utilized with the spring members 14 applied to the ends of the pipe and the plastic 16 with the desired flange formed thereon. With this type of arrangement almost any conventional pipe shape might have the principle of this invention applied thereto.

Figure 10:
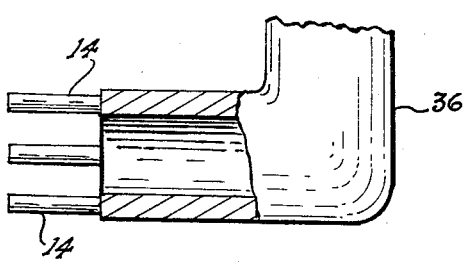
FIGURE 10 is a view, partly in section, illustrating the form applied to a conventional pipe.

FIGURE 10 illustrates the application of this invention to an elbow 36 with the resilient members 14 applied to the end of the elbow. Alternatively, the ring 12 with the spring members 14 applied thereto might be brazed or otherwise applied to the end of the elbow or a T, crossover or straight section of standard pipe. With the application of the plastic to the form in the manner described relative to FIGURE 4 the unit could be made into a stock item. It should be noted that the rods 14 need not extend through the plastic 16, but may end short of the flange 18 and be encompassed by the plastic material.

It is contemplated that the form comprising a ring 12 with spring members 14 on one side only might be manufactured with the plastic material 16 applied thereto. With this application the thickness of the ring 12 is increased such that it extends beyond the plastic 16, thereby presenting a surface that could be soldered or otherwise secured to a conventional pipe shape.

Figure 11:
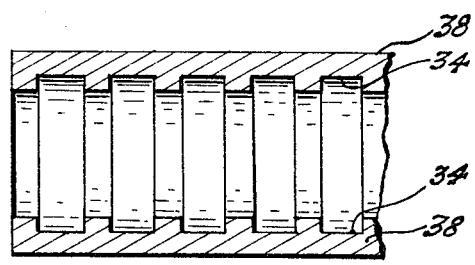
FIGURE 11 is a cross-sectional view of a corrugated pipe to which the couplings of this invention may be secured.

The rigid pipe section 38 of FIGURE 11, to which the male coupling flange 18 is to be applied, has a series of grooves 34 therein such that the pipe might be cut to a desired length and still present a groove to mate with a flange. Utilizing a section of this type of pipe would allow for a reduction in stock lengths of the coupling unit.

Although the invention has been described with reference to particular embodiments, it will be understood to those skilled in the art that the invention is capable of a variety of alternative embodiments within the spirit and scope of the appended claims.

We claim:

1. A coupling for releasable connection to a pipe comprising: a frame comprised of a base having a substantially rigid, annular end face and a plurality of upstanding rod-like members secured generally equiangularly about said face, said members being composed of a material and having a ratio of length to thickness to provide said members with a resilient characteristic such that, within their elastic limit they will twist and deform radially inwardly with respect to said annular end face upon the application of a torque force to said members; pliable means immovably secured to said members to form at least one section of a peripherally continuous conduit that extends from said annular end face to the end of said members remote from said face; and means on the exterior of said pliable means for releasably attaching said coupling with said pipe upon a reduction in diameter of said pliable means by the application of a twisting force between said base and the ends of said members remote from said base.

2. A coupling as defined in claim 1 wherein said base comprises an elbow.

3. A coupling as defined in claim 1 wherein said base comprises an end of a length of pipe.

4. A coupling as defined in claim 1 wherein said base has a second substantially rigid annular end face, and a second plurality of upstanding rod-like members secured about said second face, said second plurality of members being composed of a material to provide said second plurality of members with a resilient characteristic such that, within their elastic limit they will twist and deform radially inwardly with respect to said second annular end face upon the application of a torque force to said second plurality of members; pliable means immovably secured to said second plurality of members to form a section of a peripherally continuous conduit that extends from said second annular end face to the ends of said second plurality of members remote from said second annular end face; and means on said pliable means secured to said second plurality of members for providing a releasable attachment with a mating member upon a reduction in diameter of said pliable means.

5. A coupling as defined in claim 4 wherein said annular end faces of said base are coaxial, and including at least one rigid annular means between said coaxial annular end faces and orthogonally related thereto, said rigid annular means having an end face, spring rod-like members secured about the end face of said annular means; and pliable means secured to said spring rod-like members to form a section of conduit, said last-mentioned pliable means having, at the end thereof remote from the end face of said annular means, means for releasable attachment to a mating member upon reduction in diameter of said last-mentioned pliable means.

References Cited by the Examiner

UNITED STATES PATENTS

| 922,805 | 5/1909 | Nelson | 285—319 |
| 2,103,838 | 12/1937 | Bach | 285—306 |
| 2,246,404 | 6/1941 | Ross | 285—291 X |

(Other references on following page)

UNITED STATES PATENTS

| | | | |
|---|---|---|---|
| 2,366,067 | 12/1944 | Smith | 285—306 |
| 2,567,773 | 9/1951 | Krupp | 285—260 |
| 2,607,968 | 8/1952 | Peterson | 285—222 |
| 2,723,721 | 11/1955 | Corsette | 138—118 |
| 2,882,072 | 4/1959 | Noland | 285—291 X |
| 2,922,613 | 1/1960 | Beacham | 138—118 X |
| 2,962,051 | 11/1960 | Burkes | 138—153 |
| 3,101,205 | 8/1963 | Benham | 285—162 |

CARL W. TOMLIN, *Primary Examiner.*

R. GIANGIORGI, *Assistant Examiner.*